United States Patent Office 3,423,458
Patented Jan. 21, 1969

3,423,458
1-HYDRAZINO-ADAMANTAN AND SALTS THEREOF
Hans Ulrich Daeniker, Clifton, N.J., assignor to Ciba Corporation, New York, N.Y., a corporation of Delaware
No Drawing. Filed June 22, 1966, Ser. No. 559,382
Claims priority, application Switzerland, July 30, 1965, 10,791/65
U.S. Cl. 260—563       3 Claims
Int. Cl. C07c 109/00; A61k 25/00

The present invention relates to the new 1-hydrazino-adamantan of the formula

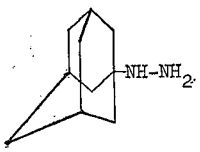

and its salts.

The new compound acts against various types of viruses such as influenza A, influenza $A_2$, influenza C, influenza D and pseudorabies, especially against virus Jap. 305 and virus PR8. The new substance can therefore be used pharmacologically in animals and as a medicament for preventing and treating virus infections, the daily oral dosage being about 25 mg.

The new compound is obtained by converting in an adamantan of the formula

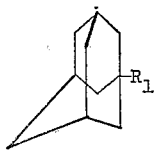

where $R_1$ represents a sydnone grouping, the residue $R_1$ by hydrolysis under acidic conditions into the hydrazino group.

The hydrolysis is carried out in the usual manner, preferably with a hydrohalic acid, for example hydrochloric acid.

The reaction is performed in the usual manner, in the presence or absence of diluents, at room temperature or above it.

The starting materials are known or can be prepared by known methods.

Depending on the reaction conditions and starting materials used the final product is obtained in the free form or in the form of its salts which are likewise included in the present invention. The salts of the final product can be converted into the free base in known manner, for example with alkalies or ion exchange resins. When the base is reacted with organic or inorganic acids, especially those which are capable of forming therapeutically acceptable salts, it yields salts. As such acids there may be mentioned, for example, the hydrohalic acids, sulphuric and phosphoric acids, nitric or perchloric acid; aliphatic, alicyclic, aromatic or heterocyclic carboxylic or sulphonic acids such as formic, acetic, propionic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicylic or para-aminosalicylic, embonic, methanesulphonic, ethanesulphonic, hydroxyethanesulphonic acid; halobenzenesulphonic, toluenesulphonic, naphthalenesulphonic or sulphanilic acid; methionine, tryptophan, lysine or arginine.

These or other salts of the new compound, such for example as the picrates, may also be used for purifying the resulting free base by converting the free base into a salt, separating the salt and isolating the free base from the salt. In view of the close relationship between the new compound in the free form and in the form of its salts, what has been said above and below with reference to the free base concerns also the corresponding salts where this is possible and useful.

The invention includes also any variant of the process in which an intermediate obtained at any stage of the present process is used as starting material and any remaining step/steps is/are carried out, or in which the starting materials are formed under the reaction conditions, or in which the reactants are used in the form of their salts.

The new compound, its salts or corresponding mixtures can be used, in human or veterinary medicine, for example, in the form of pharmaceutical preparations which contain the compounds mentioned in admixture or conjunction with an organic or inorganic pharmaceutical excipient suitable for enteral or parenteral administration. Suitable excipients are substances that do not react with the compounds described, for example water, gelatin, lactose, white petroleum jelly, starches, magnesium stearate, talcum, vegetable oils, benzyl alcohols, gums, polyalkyleneglycols, cholesterol or other known medicinal excipients. The pharmaceutical preparations may be, for example, tablets or dragees, or in liquid form solutions, suspensions or emulsions. They may be sterilized and/or contain assistants such as preserving, stabilizing, wetting or emulsifying agents. They may also contain further therapeutically valuable substances. In the veterinary section the new active substance may also be used together with additives to animal fodder and/or in conjunction or admixture with conventional animal fodders or liquid feeds. The preparations are formulated in the usual manner.

The following examples illustrate the invention. Temperatures are given in degrees centigrade.

EXAMPLE 1

A suspension of 8.7 g. of 3-(adamantyl-1)-sydnone in a mixture of 150 ml. of ethanol and 100 ml. of concentrated hydrochloric acid is heated on a steam bath. Very soon, a moderately strong evolution of gas sets in which ceases after about 15 minutes, and the solution has become clear by then; it is refluxed for 45 minutes and evaporated to dryness. The colourless, crystalline residue is recrystallized from 130 ml. of isopropanol, to yield 1-hydrazino-adamantan hydrochloride which melts at 250° C. with decomposition. Its proton resonance spectrum in heavy water contains a broad signal with centre at 2.2 parts per million and a multiplet of 1.7 to 1.9 parts per million.

The starting material used is prepared as follows: 7.6 grams of 1 - amino - adamantan hydrochloride are dissolved in 80 ml. of water, 3.2 g. of an aqueous formaldehyde solution (of 37 to 40% strength) are added and while stirring the clear solution at room temperature, a solution of 2.6 g. of potassium cyanide in 20 ml. of water is dropped in. A crystalline precipitate forms immediately and is stirred overnight. The batch is then extracted with chloroform and on evaporation an oil is obtained which crystallizes and melts at 40 to 50° C. The resulting N - (adamantyl - 1) - aminoacetonitrile is used in this crude state for the next stage. For purification the product is recrystallized from a small amount of ether and petroleum ether, whereupon it melts at 50 to 52° C. The infrared spectrum in methylenechloride contains a weak band at $3.12\mu$ and a suggested absorption at $4.52\mu$.

7.5 grams of crude N - (adamantyl - 1) - aminoacetonitrile in a mixture of 50 ml. of water, 50 ml. of glacial acetic acid and 50 ml. of concentrated hydrochloric acid are refluxed, whereby quickly a clear reaction solution (part A) is obtained; at the same time a colourless crystalline sublimate (part B) forms inside the reflux condenser.

Part A.—After 6 hours' reaction the solution is evaporated under vacuum to dryness and the N-(adamantyl - 1) - glycine, obtained as evaporation residue, is used in the next stage. The latter compound is easy to isolate by dissolving the residue in water and adjusting the pH value to 4. The resulting colourless crystals melt at 300° C. with decomposition. The infrared spectrum (in Nujol) contains bands at 2.84, 3.8, 4.1 and 6.27μ.

Part B.—The sublimate is dissolved in chloroform, dried and evaporated, to yield colourless crystals melting at 150 to 152° C. in a fused capillary. On recrystallization from isopropanol and sublimation it yields pure 1-chloradamantan, identified by the mixed melting point and comparison of the proton resonance spectra.

The crude N - (adamantyl - 1) - glycine (part A) is dissolved in 100 ml. of 2 N hydrochloric acid and, while stirring at room temperature, a solution of 5 g. of sodium nitrite in 20 ml. of water is slowly dropped in. At first the solution remains clear, but thereupon gradually colourless crystals settle out from it which are left to themselves overnight, then suctioned off, washed with water and dried, to yield pure N - nitroso - N - (adamantyl - 1) - glycine which melts at 158° C. with decomposition. The compound can be recrystallized from absolute alcohol, after which its melting point remains unchanged.

2.7 grams of N - nitroso - N - (adamantyl - 1) - glycine are mixed with trifluoroacetic anhydride, whereupon the reaction mixture heats up slightly, and a clear, reddish solution is quickly formed. The reaction mixture is kept for 1 hour at room temperature and evaporated to dryness under vacuum. The residual oil is taken up in chloroform and washed with a 10% aqueous solution of sodium bicarbonate. Evaporation of the chloroformic solution yields 3 - (adamantyl - 1) - sydnone in the form of colourless crystals melting at 215 to 217° C. with decomposition. On recrystallization from methanol colourless needles, having the same melting point, are obtained. The ultraviolet spectrum in rectified spirit contains a maximum at 290μ (ε=7100). The infrared spectrum in methylenechloride contains bands at 3.12 and 5.71μ. The proton resonance spectrum in deuterized chloroform displays a signal each at 6.3 and 2.25 parts per million and a broad signal with centre at 1.8 parts per million.

EXAMPLE 2

The corresponding free base is obtained by dissolving 1 - hydrazino - adamantan hydrochloride in water and adding a small amount of saturated potassium carbonate solution. The resulting colourless, crystalline precipitate is suctioned off and recrystallized from ether, to yield colourless needles which melt at 80° C., then solidify again and decompose at about 180° C. The infrared spectrum in methylenechloride contains bands at 2.70, 2.76 and 2.94μ.

The product can be sublimed in a high vacuum at 100° C. The colourless, crystalline sublimate melts at 75° C. Its proton resonance spectrum in deuterized chloroform displays a signal at 3.6, a broad signal at 2.1 and a doublet at 1.7 parts per million. Signals that would suggest the presence of impurities are absent.

EXAMPLE 3

Preparation of 10,000 tablets each containing 12.5 mg. of the active substance:

| Ingredients: | G. |
|---|---|
| 1-hydrazino-adamantane hydrochloride | 125.0 |
| Wheat starch | 400.0 |
| Lactose | 595.0 |
| Colloidal silicic acid | 50.0 |
| Arrowroot | 150.0 |
| Talc | 70.0 |
| Magnesium stearate | 10.0 |

Method.— The active substance is mixed with part of the wheat starch, with lactose and coolloidal silicic acid, and the mixture passed through a sieve. The remaining wheat starch is pasted with 5 times the quantity of water on a water-bath and the powder mixture kneaded with this paste until a slightly plastic mass is formed.

The plastic mass is pressed through a sieve having a mesh of about 3 mm., dried and the dried granulate passed again through a sieve. Arrowroot, talc and magnesium stearate are then added, and the resulting mixture compressed into tablets weighing 140 mg.

What is claimed is:
1. 1 - hydrazino - adamantan of the formula

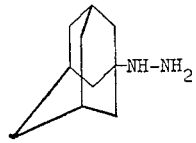

2. An therapeutically acceptable acid addition salt of the compound claimed in claim 1.
3. The hydrochloride of the compound claimed in claim 1.

References Cited

FOREIGN PATENTS 1,484,656    8/1967    France.

OTHER REFERENCES

Derwent Belgian Patents Report, No. 5, 1967, p. 3:3 (Mar. 6, 1967), 684853.

CHARLES B. PARKER, *Primary Examiner.*

PATRICIA C. IVES, *Assistant Examiner.*

U.S. Cl. X.R.

260—501.2, 501.11, 326.14, 343.7, 464, 307, 514, 648, 501.12; 424—327